US010036466B2

(12) United States Patent
Kim (10) Patent No.: US 10,036,466 B2
(45) Date of Patent: Jul. 31, 2018

(54) TRANSMISSION OIL BYPASS ASSEMBLY (71) Applicant: KORENS CO., LTD., Yangsan (KR)

(72) Inventor: Tae Jin Kim, Yangsan (KR)

(73) Assignee: KORENS CO., LTD., Yangsan-si (KR)

( * ) Notice: Subject to any disclaimer, the term of this patent is extended or adjusted under 35 U.S.C. 154(b) by 11 days.

(21) Appl. No.: 15/508,149

(22) PCT Filed: Sep. 5, 2014

(86) PCT No.: PCT/KR2014/008369
§ 371 (c)(1),
(2) Date: Mar. 2, 2017

(87) PCT Pub. No.: WO2016/035910
PCT Pub. Date: Mar. 10, 2016

(65) Prior Publication Data
US 2017/0299045 A1 Oct. 19, 2017

(30) Foreign Application Priority Data
Sep. 5, 2014 (KR) ........................ 10-2014-0118260

(51) Int. Cl.
F16H 57/04 (2010.01)
F16K 31/00 (2006.01)

(52) U.S. Cl.
CPC ....... F16H 57/0417 (2013.01); F16K 31/002 (2013.01)

(58) Field of Classification Search
CPC .... F16K 31/002; F16H 57/0417; F28F 27/02; F28F 2250/06; F28D 9/005; F28D 2021/0089; G05D 23/1852; F01P 11/08; F01P 2007/146; F01P 7/16
See application file for complete search history.

(56) References Cited

U.S. PATENT DOCUMENTS 3,440,833 A * 4/1969 Fernandes ............... F25B 39/04
165/297
5,791,557 A * 8/1998 Kunze ................ G05D 23/1333
236/34.5

(Continued)

FOREIGN PATENT DOCUMENTS

WO 99/15767 4/1999
WO 2013/175809 11/2013

Primary Examiner — Tho V Duong
(74) Attorney, Agent, or Firm — Lex IP Meister, PLLC (57) ABSTRACT Disclosed is a transmission oil bypass assembly including: a body formed in a pipe shape such that a first longitudinal side of the body is inserted into a first heat exchanger for heat exchange of transmission oil, with a bypass passage provided at a second longitudinal side of the body by protruding outside the first heat exchanger, and openings formed on a side wall of the body to allow the transmission oil to be introduced therethrough; a returning pipe configured to return the transmission oil introduced through the body to the transmission; a thermal expansion unit inserted into the body; a returning-side on/off valve configured to close an internal passage of the returning pipe when a length of the thermal expansion unit is increased; and a bypass-side on/off valve configured to close the bypass passage when the length of the thermal expansion unit is decreased.

9 Claims, 9 Drawing Sheets (56) References Cited

U.S. PATENT DOCUMENTS

| | | | |
|---|---|---|---|
| 7,617,700 B2* | 11/2009 | Lamb | G05D 23/022 |
| | | | 165/297 |
| 2006/0060347 A1 | 3/2006 | Moser | |
| 2006/0076129 A1* | 4/2006 | Eliades | F28F 27/02 |
| | | | 165/297 |
| 2008/0029246 A1* | 2/2008 | Fratantonio | F16H 57/0412 |
| | | | 165/103 |
| 2014/0182522 A1 | 7/2014 | Lee | |
| 2015/0101781 A1* | 4/2015 | Kim | F01P 3/12 |
| | | | 165/96 |

* cited by examiner

TRANSMISSION OIL BYPASS ASSEMBLY

TECHNICAL FIELD

The present invention relates generally to a transmission oil bypass assembly for controlling a flow direction of transmission oil by identifying a cold start state or a normal driving state of a vehicle. More particularly, the present invention relates to a transmission oil bypass assembly in which a structure of the assembly can be simplified and assembly performance of the assembly can be improved by installing the assembly inside a first heat exchanger for heating or cooling transmission oil by using a heat source of coolant.

BACKGROUND ART

In general, a vehicle is provided with a heat exchange-type cooling system, such as a radiator or oil cooler, in addition to an air conditioning system for cooling an interior of a vehicle. A radiator is a heat exchanger configured such that coolant is circulated inside the engine to absorb heat generated by combustion of an engine, and then the high temperature coolant passes through the radiator by using a water pump, and emits the heat outside the engine. Thus, the radiator prevents an engine from overheating, and maintains an optimal driving condition.

Furthermore, though an engine or transmission for a vehicle is filled with oil so as to be lubricated or sealed, when oil is overheated, viscosity of oil is decreased and the above purposes of lubrication and sealing may not be achieved. Particularly, an engine or other components for a vehicle may be damaged when the engine or the other components are not properly lubricated. In this case, an oil cooler for cooling oil is utilized to prevent this problem.

Since an engine is considerably heated while driving, temperatures of coolant and oil are also increased, and thus a radiator and oil cooler cool coolant and oil, respectively. Meanwhile, when a temperature of oil is decreased, viscosity of oil is increased. Thus, in a cold environment, an engine for a vehicle is started in a state where viscosity of oil is high. In this case, if oil is further cooled by using an oil cooler, an engine or other components for a vehicle may be damaged. This damage is called cold shock. Accordingly, various ways to prevent cold shock are used, for example, an oil cooler is not operated when an engine is started, or a warmer for heating oil is operated.

Figure 1:
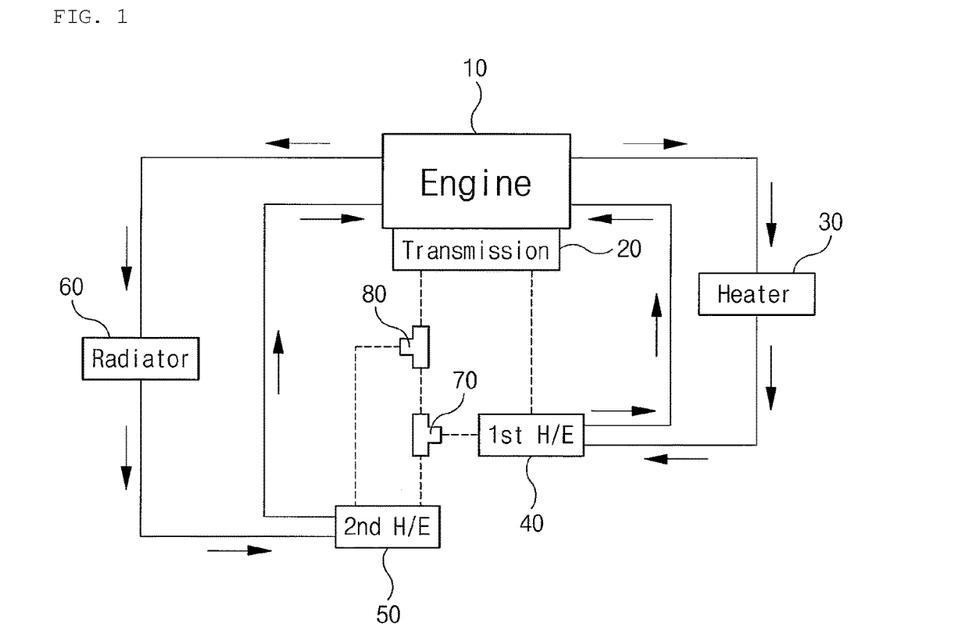
FIG. 1 is a view illustrating a transmission oil heat exchange system according to the related art.

FIG. 1 is a view illustrating a transmission oil heat exchange system according to the related art.

In general, coolant circulated around an engine 10 is circulated along a full line shown in FIG. 1 by passing through a coolant heater 30, a first heat exchanger 40 (generally referred to simply as a warmer), a radiator 60, and a second heat exchanger 50 (generally referred to simply as a cooler). Furthermore, transmission oil filling a transmission 20 is circulated along a dotted line shown in FIG. 1. That is, the transmission oil passes through the first and second heat exchangers 40 and 50, and returns to the transmission 20.

When an outside temperature is low as in a winter season, a temperature of transmission oil is also decreased, thereby increasing viscosity of the transmission oil. Thus, when an engine is started, cold shock may occur in the transmission 20 due to increased viscosity of transmission oil. Accordingly, at a cold start of an engine, transmission oil passes the first heat exchanger 40 for heat exchange between the transmission oil and coolant heated by the heater 30, and the transmission oil is partially heated. Further, the transmission oil passes through a bypass valve 70 and a returning valve 80 that are formed in a three way valve shape, and returns to the transmission 20.

Meanwhile, since transmission oil is considerably heated while normally driving, the transmission oil should be partially cooled. In this case, the coolant heater 30 that is operated at a cold start of an engine is turned off after an engine is driven for a predetermined period. Thus, a temperature of coolant introduced into the first heat exchanger 40 is lower than a temperature of transmission oil, and the transmission oil introduced into the first heat exchanger 40 is partially cooled by exchanging heat between the transmission oil and the coolant. However, when a temperature of the transmission oil is considerably high, since the transmission oil cannot be sufficiently cooled at the first heat exchanger 40, the transmission oil having passed through the first heat exchanger 40 is introduced into the second heat exchanger 50 through the bypass valve 70, is cooled once again, and returns to the transmission 20 through the returning valve 80.

As described, in order to change a flow direction of transmission oil depending on a temperature of the transmission oil, a thermostat (not shown) for measuring a temperature of the transmission oil and a control device (not shown) for controlling the bypass valve 70 should be separately provided. Thus, it is problematic in that the structure of the system is complicated. Furthermore, it is also problematic in that since the bypass valve 70 for controlling a flow direction of transmission oil is separately provided from the first heat exchanger 40, assembly process of the system is complicated, thereby decreasing productivity.

DISCLOSURE

Technical Problem

Accordingly, the present invention has been made keeping in mind the above problems occurring in the related art, and the present invention is intended to propose a transmission oil bypass assembly in which a flow direction of transmission oil can be controlled depending on a temperature of the transmission oil without a separate thermostat for measuring a temperature of the transmission oil or without a separate control device for controlling a passage, and a structure and assembly process of the assembly can be simplified by installing the assembly inside a first heat exchanger.

Technical Solution

In order to achieve the above object, according to one aspect of the present invention, there is provided a transmission oil bypass assembly, the assembly including: a body formed in a pipe shape such that a first longitudinal side of the body is inserted into a first heat exchanger by crossing transmission oil passages formed in the first heat exchanger for heat exchange between coolant having passed through a coolant heater and transmission oil drawn from a transmission, with a bypass passage provided at a second longitudinal side of the body by protruding outside the first heat exchanger, and openings formed on a side wall of the body to allow the transmission oil to be introduced therethrough; a returning pipe coupled to the first heat exchanger so as to communicate with the first longitudinal side of the body, and configured to return the transmission oil introduced through the body to the transmission; a thermal expansion unit configured to increase or decrease a length thereof depending on a temperature of the transmission oil flowing in the first heat exchanger, the thermal expansion unit being inserted into the body; a returning-side on/off valve coupled to a first longitudinal side of the thermal expansion unit, and configured to close an internal passage of the returning pipe when the length of the thermal expansion unit is increased; and a bypass-side on/off valve coupled to a second longitudinal side of the thermal expansion unit, and configured to close the bypass passage when the length of the thermal expansion unit is decreased.

The thermal expansion unit may include: a first body formed in a cylindrical shape, and filled with wax expanded by external heat; a ductile cap configured to seal an inlet of the first body, and deformed by the expansion of the wax; a second body formed in a pipe shape, and coupled to the inlet of the first body and filled with flowable silicone in part of interior space thereof, the part facing the ductile cap; and a piston of which a first longitudinal side is inserted into the second body and a second longitudinal side is fixed to an interior of the body.

The returning-side on/off valve may be coupled to a first longitudinal side of the first body so as to surround an outer circumferential surface of the first longitudinal side of the first body, and the bypass-side on/off valve may be coupled to a second longitudinal side of the second body so as to surround an outer circumferential surface of the second longitudinal side of the second body.

A seat block having a seat groove formed therein may be provided at a position inside the body, at which the bypass passage is formed, and the second longitudinal side of the piston may be inserted into the seat groove.

The assembly may further include: a spring inserted into the body so as to surround the thermal expansion unit such that a first longitudinal side of the spring is directed toward the returning pipe, and a second longitudinal side of the spring is seated on the bypass-side on/off valve; and a stopper placed to cover an inner circumferential surface of the first longitudinal side of the body such that the first longitudinal side of the spring is seated on the stopper.

The assembly may further include: a stop ring coupled to the inner circumferential surface of the body so as to support a first side of the stopper, the first side of the stopper being opposite to a second side of the stopper on which the spring is seated.

At least three guide protrusions may be provided in the internal passage of the returning pipe at a side directed toward the returning-side on/off valve such that the guide protrusions extend to come into contact with an outer end of the returning-side on/off valve.

A protrusion may be formed on an inner circumferential surface of an inlet of the bypass passage, and the bypass-side on/off valve may be seated on the protrusion of the bypass passage, thereby sealing the bypass passage.

The bypass passage may be configured such that the transmission oil is supplied through the bypass passage to a second heat exchanger for heat exchange between the coolant cooled by a radiator and the transmission oil.

Advantageous Effects

According to the present invention having the above-described characteristics, it is possible to propose a transmission oil bypass assembly in which a flow direction of transmission oil can be controlled depending on a temperature of the transmission oil without a separate thermostat for measuring a temperature of the transmission oil or without a separate control device for controlling a passage, and a structure and assembly process of the assembly can be simplified by installing the assembly inside a first heat exchanger, thereby decreasing manufacturing costs thereof.

MODE FOR INVENTION

Hereinbelow, a transmission oil bypass assembly according to an embodiment of the present invention will be described in detail with reference to the accompanying drawings.

Figure 2:
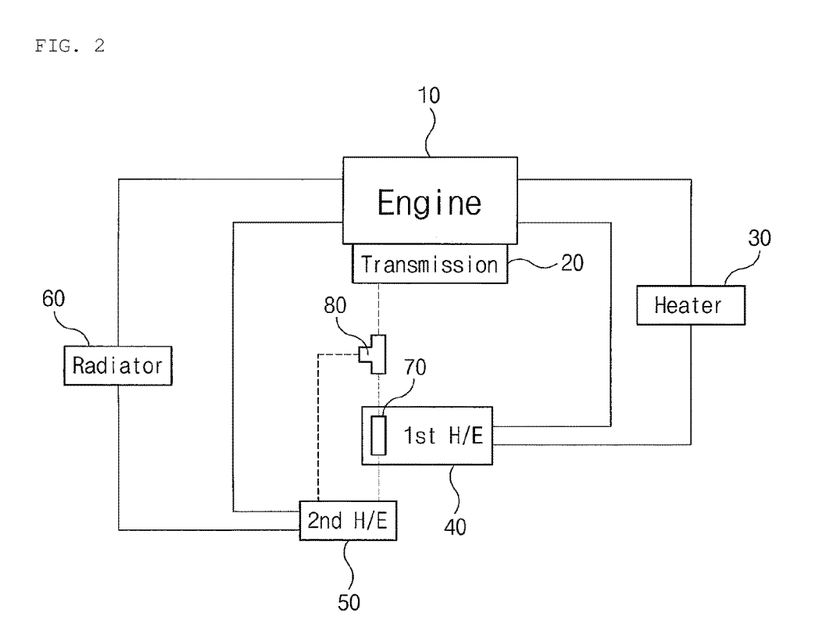
FIG. 2 is a view illustrating a transmission oil heat exchange system using a transmission oil bypass assembly according to the present invention.

FIG. 2 is a view illustrating a transmission oil heat exchange system using the transmission oil bypass assembly according to the present invention.

At a cold start of an engine 10, transmission oil drawn from a transmission 20 is introduced into a first heat exchanger 40, the transmission oil is partially heated at the first heat exchanger 40 by exchanging heat between the transmission oil and coolant heated by a coolant heater 30, and the transmission oil returns to the transmission 20. Meanwhile, when transmission oil is considerably heated after the engine 10 is driven for a predetermined period, the coolant heater 30 is turned off. In this case, the transmission oil is introduced into the first heat exchanger 40, the transmission oil is partially cooled at the first heat exchanger 40 by exchanging heat between the transmission oil and coolant having a lower temperature than a temperature of the transmission oil. Further, the transmission oil is introduced into a second heat exchanger 50, is cooled once again, and is returned to the transmission 20 through a returning valve 80.

That is, depending on a temperature of the transmission oil introduced into the first heat exchanger 40, the transmission oil may directly return to the transmission, or return to the transmission via the second heat exchanger 50. In this case, the transmission oil bypass assembly 1 according to the present invention is configured to control a flow direction of the transmission oil introduced into the first heat exchanger 40, and is characterized in that the assembly 1 is coupled to the first heat exchanger 40 in such a way that the assembly 1 is inserted into the first heat exchanger 40.

As shown in FIG. 1, since a bypass valve 70 according to the related art is separately provided outside a first heat exchanger 40, the first heat exchanger 40 and the bypass valve 70 should be separately manufactured. Thus, it is problematic in that manufacturing costs thereof are increased, additional installation space thereof is needed, and more time is spent in installing a transmission oil heat exchange system including the same. However, since the transmission oil bypass assembly 1 according to the present invention is installed inside the first heat exchanger 40, it is advantageous in that manufacturing costs thereof may be reduced, an entire transmission oil heat exchange system including the same may be minimized by reducing installation space thereof, and less time may be spent in installing the transmission oil heat exchange system.

Hereinbelow, a structure, in which the assembly 1 is installed inside the first heat exchanger 40, and operation of the assembly 1 are described in detail with reference to FIGS. 3 to 9.

Figure 3:
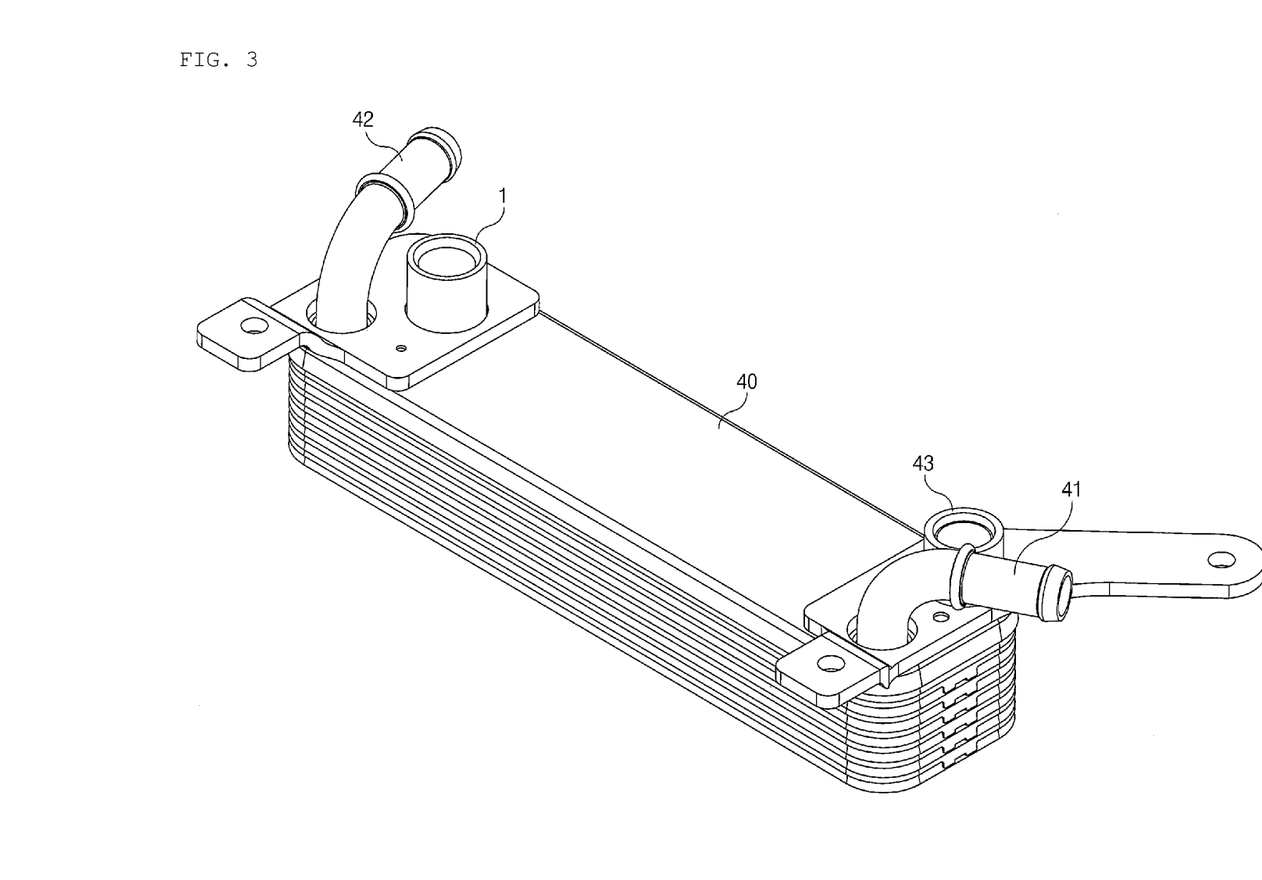
FIG. 3 is a perspective view of a first heat exchanger to which the assembly according to the present invention is coupled.
Figure 4:
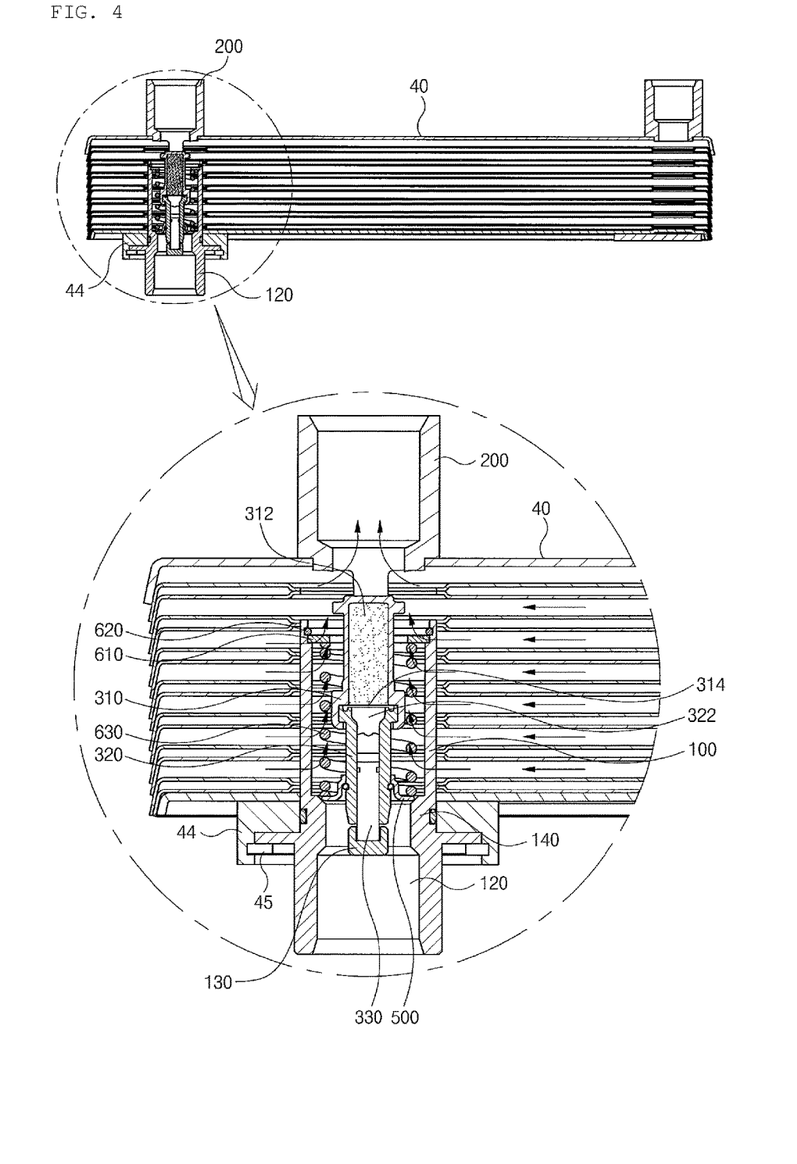
FIG. 4 is a sectional view of the first heat exchanger to which the assembly according to the present invention is coupled.
Figure 5:
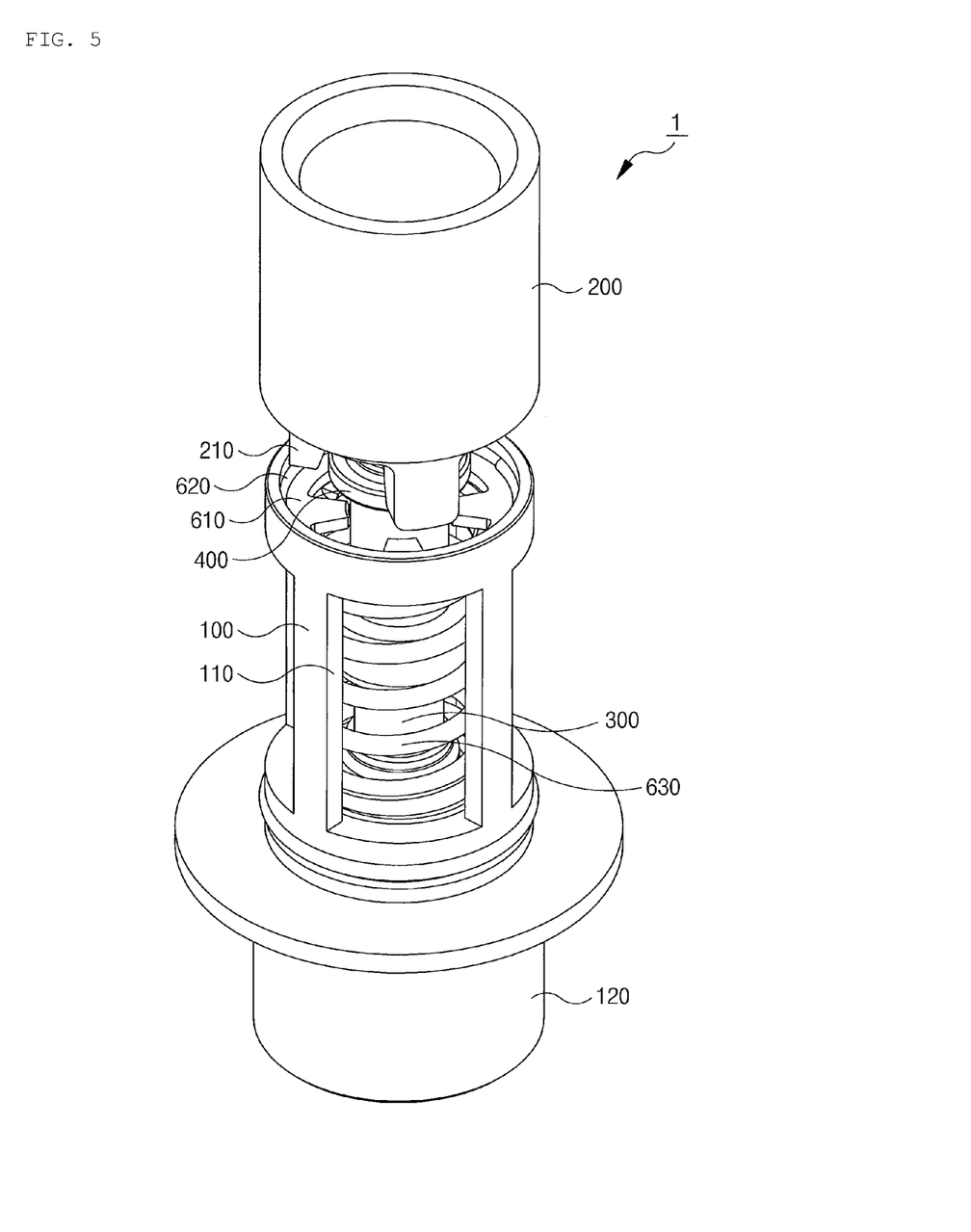
FIG. 5 is a perspective view of the assembly according to the present invention.
Figure 6:
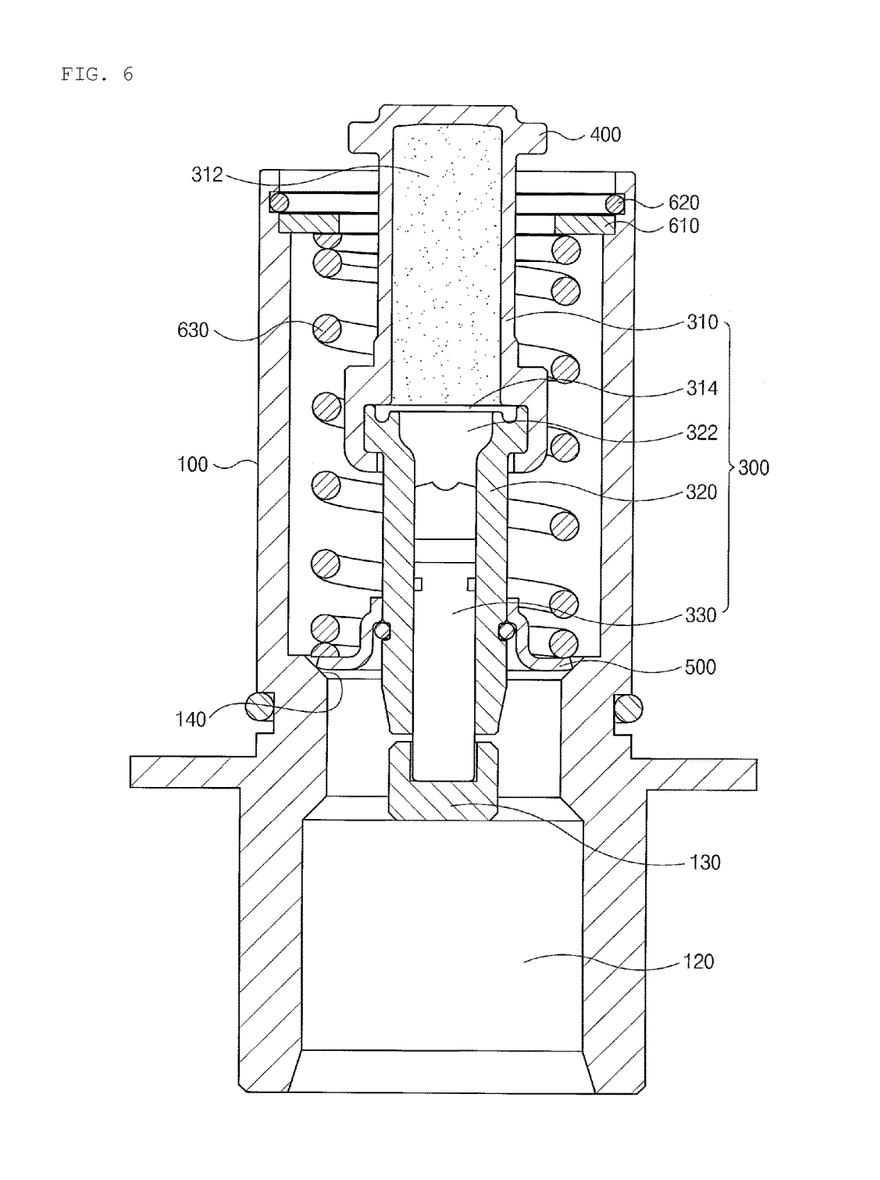
FIG. 6 is a sectional view illustrating a coupled structure of a thermal expansion unit and a body according to the present invention.
Figure 7:
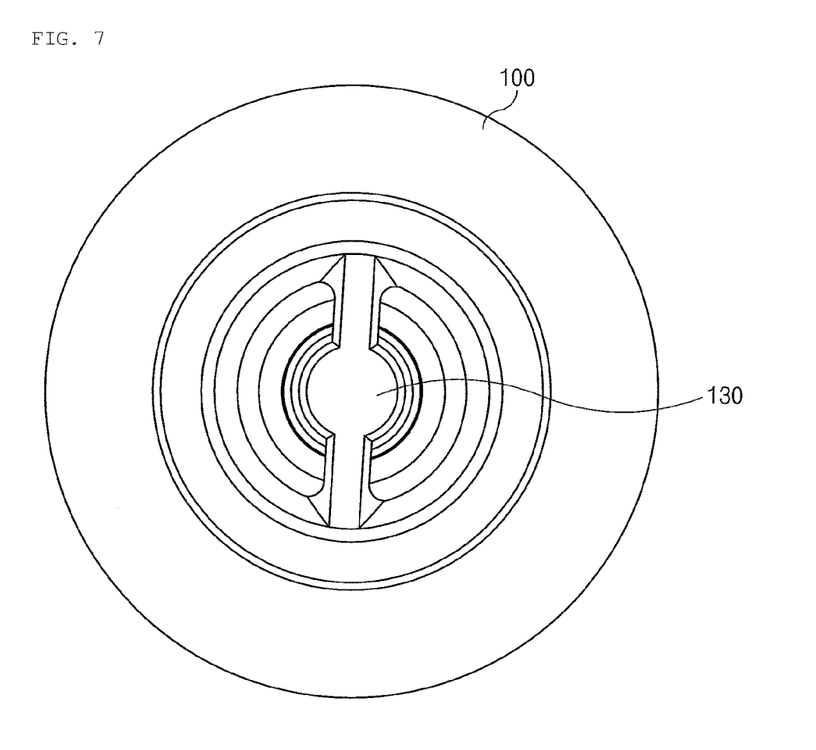
FIG. 7 is a plan view of the body according to the present invention.
Figure 8:
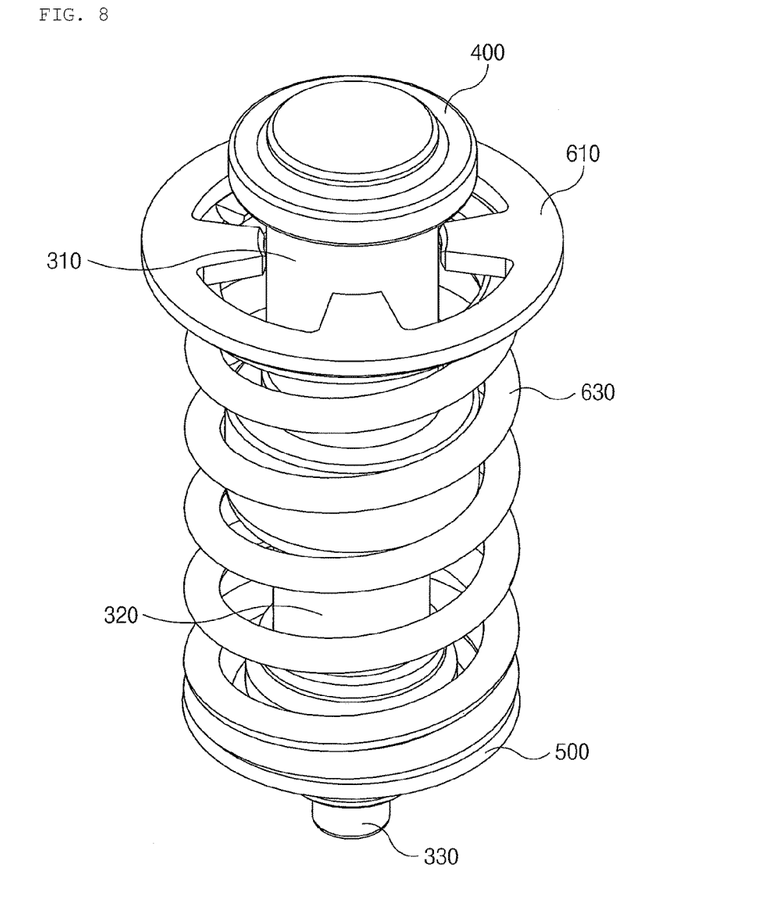
FIG. 8 is a perspective view illustrating a coupled structure of a spring according to the present invention.

FIG. 3 is a perspective view of the first heat exchanger to which the assembly 1 according to the present invention is coupled, FIG. 4 is a sectional view of the first heat exchanger to which the assembly 1 according to the present invention is coupled, and FIG. 5 is a perspective view of the assembly 1 according to the present invention. Furthermore, FIG. 6 is a sectional view illustrating a coupled structure of a thermal expansion unit 300 and a body 100 according to the present invention, FIG. 7 is a plan view of the body 100 according to the present invention, and FIG. 8 is a perspective view illustrating a coupled structure of a spring 630 according to the present invention.

The assembly 1 according to the present invention includes: the body 100 formed in a pipe shape such that a first longitudinal side (an upper side in the present embodiment) of the body 100 is inserted into the first heat exchanger 40 by crossing transmission oil passages formed in the first heat exchanger 40; a returning pipe 200 coupled to the first heat exchanger 40 so as to communicate with the first longitudinal side of the body 100, and configured to return transmission oil introduced through the body 100 to the transmission 20; the thermal expansion unit 300 configured to increase or decrease a length thereof depending on a temperature of the transmission oil flowing in the first heat exchanger, and inserted into the body 100; a returning-side on/off valve 400 coupled to a first longitudinal side (an upper side in the present embodiment) of the thermal expansion unit 300, and configured to close an internal passage of the returning pipe 200 when the length of the thermal expansion unit 300 is increased; and a bypass-side on/off valve 500 coupled to a second longitudinal side (a lower side in the present embodiment) of the thermal expansion unit 300, and configured to close a bypass passage 120 when the length of the thermal expansion unit 300 is decreased. In this case, the body 100 is upwardly inserted into the first heat exchanger 40 through a fixing bracket 44 provided on a lower surface of the first heat exchanger 40, and is fixed to the fixing bracket 44 by using a snap ring 45. Thus, the body 100 may be simply coupled to the first heat exchanger 40 without separate a bolt.

The first heat exchanger 40 is configured such that a plurality of plates is stacked. In this case, intermediate portions of the plurality of plates are spaced apart from each other, and opposite ends of the plurality of plates are coupled to each other by coming into close contact with each other. Thus, coolant and transmission oil may flow through a passage formed between the two plates. A coolant introduction pipe 41 and a transmission oil introduction pipe 43 are provided at a first longitudinal side (a right side in the present embodiment) of the first heat exchanger 40, and a coolant returning pipe 200 and 42 and the assembly 1 are provided at a second longitudinal side (a left side in the present embodiment) of the first heat exchanger 40. In this case, coolant and transmission oil are introduced into the first longitudinal side of the first heat exchanger 40, and flow in the first heat exchanger 40. Thus, heat is exchanged between the coolant and the transmission oil, and the coolant and the transmission oil are discharged through the second longitudinal side of the first heat exchanger 40. In this case, since the passages for the respective coolant and transmission oil are alternately provided, the coolant and transmission oil exchange heat therebetween while flowing in the passages formed between the plurality of plates. Since the first heat exchanger 40, in which the plurality of plates is stacked, is also utilized in a transmission oil heat exchange system according to the related art, detailed descriptions thereof are omitted.

Meanwhile, openings 110 are formed on a side wall of the body 100 to allow the transmission oil to be introduced therethrough, and the bypass passage 120 is provided at a second longitudinal side of the body 100 by protruding outside the first heat exchanger. Accordingly, the transmission oil that has exchanged heat with the coolant by flowing in the first heat exchanger 40 is introduced into the body 100 through the openings 110, and the transmission oil may directly return to the transmission through the returning pipe 200 or is introduced into the second heat exchanger 50 through the bypass passage 120 of the body 100.

It is determined depending on the expansion of the thermal expansion unit 300 whether the transmission oil introduced into the body 100 flows to the returning pipe 200 or to the bypass passage 120. In this case, the length of the thermal expansion unit 300 is increased or decreased depending on a temperature of the transmission oil introduced into the first heat exchanger. That is, the thermal expansion unit 300 includes: a first body 310 formed in a cylindrical shape, and filled with wax 312 expanded by external heat; a ductile cap 314 configured to seal an inlet of the first body 310, and deformed by the expansion of the wax 312; a second body 320 formed in a pipe shape, and coupled to the inlet of the first body 310 and filled with flowable silicone 322 in part of interior space thereof such that the part faces the ductile cap 314; and a piston 330 of which a first longitudinal side is inserted into the second body 320 and a second longitudinal side is fixed to an interior of the body 100.

Accordingly, when a temperature of the transmission oil is relatively low, for example, at the cold start of the engine 10, the wax 312 inside the first body 310 is not expanded. Thus, as shown in FIG. 4, the length of the thermal expansion unit 300 is decreased, that is, the piston 330 is maximally inserted into the second body 320. In this case, a seat block 130 having a seat groove formed therein is provided at a position inside the body 100, at which the bypass passage 120 is formed, and the second longitudinal side (a lower side in the present embodiment) of the piston 330 is inserted into the seat groove of the seat block 130.

That is, since the piston 330 continues to be fixed to the seat block 130, when the piston 330 is maximally inserted into the second body 320 as described, the first and second bodies 310 and 320 are maximally lowered. Thus, the bypass-side on/off valve 500, provided on an outer circumferential surface of the second body 320 so as to surround the outer circumferential surface of the second body 320, closes the bypass passage 120. Further, the returning-side on/off valve 400, provided on an outer circumferential surface of the first body 310 so as to surround the outer circumferential surface of the first body 310, is downwardly spaced apart from the returning pipe 200. Accordingly, the transmission oil introduced into the body 100 directly returns to the transmission through the returning pipe 200.

Meanwhile, a protrusion 140 is formed on an inner circumferential surface of an inlet of the bypass passage 120 so that the bypass passage 120 may be sealed when the bypass-side on/off valve 500 is lowered. Thus, the bypass-side on/off valve 500 is seated on the protrusion 140 of the bypass passage 120, and the bypass passage 120 is sealed.

In this case, when the bypass-side on/off valve 500 is seated on the protrusion 140 by a self load of the thermal expansion unit 300, the bypass passage 120 may be opened in such a way that the bypass-side on/off valve 500 is raised by pressure of the transmission oil introduced into the body 100. To solve this problem, according to the assembly 1 of the present invention, it is desirable that the bypass-side on/off valve 500 is pressed to the protrusion 140 by an elastic force of the separate spring 630.

That is, the assembly 1 according to the present invention may further include: the spring 630 inserted into the body 100 so as to surround the thermal expansion unit 300 such that a first longitudinal side of the spring 630 is directed toward the returning pipe 200, and a second longitudinal side of the spring 630 is seated on the bypass-side on/off valve 500; and a stopper 610 placed to cover an inner circumferential surface of the first longitudinal side of the body 100 such that the first longitudinal side of the spring 630 is seated on the stopper 610. The spring 630 is provided between the bypass-side on/off valve 500 and the stopper 610 in a state of being pressed. Thus, the bypass-side on/off valve 500 is pressed to the protrusion 140 by an elastic force of the spring 630, and the bypass passage 120 may be stably sealed.

In this case, the elastic force of the spring 630 is applied to the bypass-side on/off valve 500, and also applied to the stopper 610. Thus, the stopper 610 may escape from the body 100. Accordingly, the assembly 1 according to the present invention may further include: a stop ring 620 that prevents the stopper 610 from escaping from the body 100 by being coupled to the inner circumferential surface of the body 100 so as to support a first side of the stopper 610 such that the first side of the stopper 610 is opposite to a second side of the stopper on which the spring 630 is seated.

Figure 9:
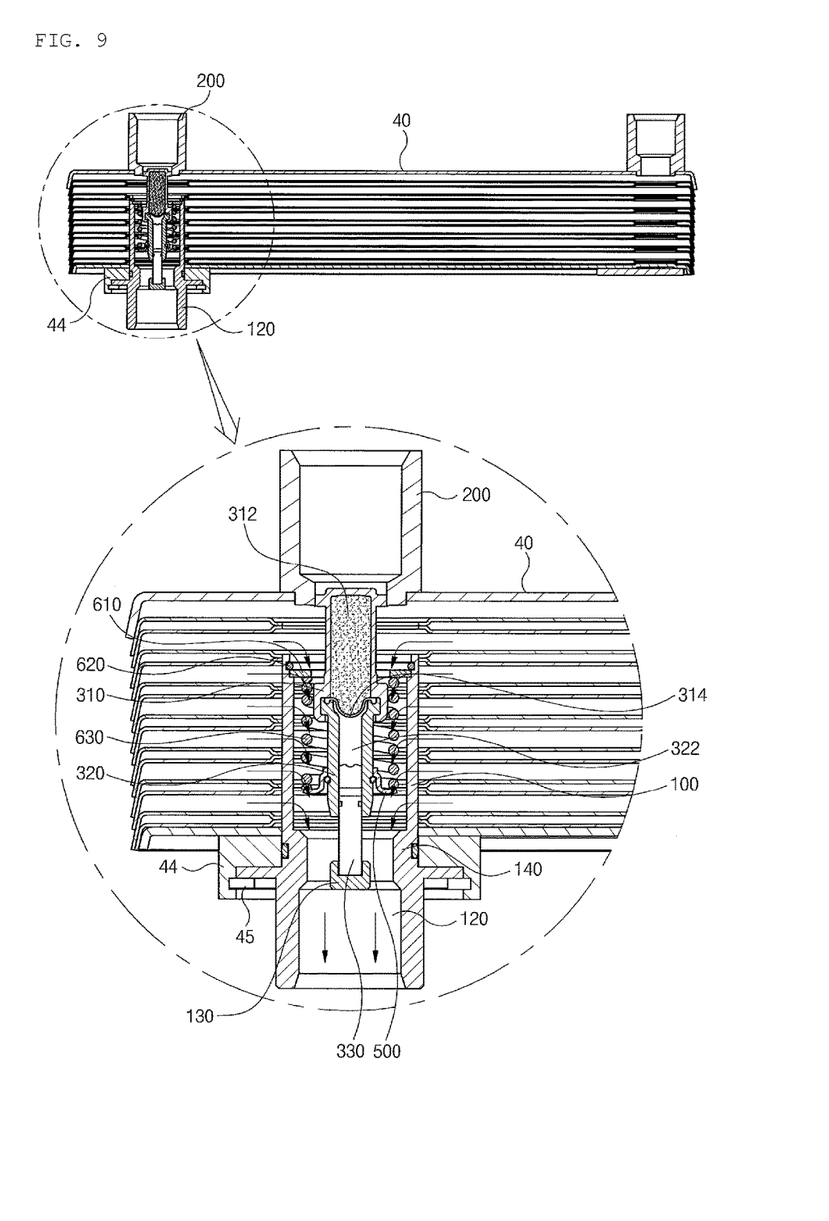
FIG. 9 is a sectional view of the first heat exchanger when the assembly according to the present invention is operated so that transmission oil is introduced into a second heat exchanger.

FIG. 9 is a sectional view of the first heat exchanger when the assembly 1 according to the present invention is operated so that the transmission oil is introduced into the second heat exchanger.

When the engine 10 is driven for a predetermined period, the transmission oil is considerably heated and should be cooled. In this case, when the transmission oil having passed through the first heat exchanger 40 directly returns to the transmission, it is problematic in that the transmission oil is gradually overheated.

Accordingly, when a temperature of the transmission oil is higher than a predetermined level, the assembly 1 according to the present invention guides the transmission oil having passed through the first heat exchanger 40 to the second heat exchanger 50 so that the transmission oil is cooled until a temperature of the transmission oil is lowered than the predetermined level.

That is, when a temperature of the transmission oil introduced into the first heat exchanger 40 is higher than a predetermined level, the wax 312 filling the first body 310 is expanded, and the ductile cap 314 is bulbously deformed in a downward direction as shown in FIG. 9. Thus, flowable silicone inside the second body 320 is downwardly moved by the ductile cap 314, and the piston 330 is drawn outside the second body 320. Since the thermal expansion unit 300, in which the piston 330 is drawn by the expansion of the wax 312 filling the first body 310, is a commonly used part in a technical filed to which the present invention belongs, detailed descriptions of an internal structure and operation principle of the thermal expansion unit are omitted.

Since the piston 330 is fixed to the seat block 130, when the piston 330 is drawn outside the second body 320, the second body 320 and the first body 310 coupled thereto are raised without lowering the piston 330. In this case, when the second body 320 and the first body 310 rise, the returning-side on/off valve 400, coupled to an outer circumferential surface of a first longitudinal side (an upper side in the present embodiment) of the first body 310 so as to surround the outer circumferential surface of the first longitudinal side of the first body 310, also rises together with the first body 310. Thus, the returning-side on/off valve 400 closes the internal passage of the returning pipe 200. Furthermore, when the second body 320 and the first body 310 rise, the bypass-side on/off valve 500, coupled to an outer circumferential surface of a second longitudinal side (a lower side in the present embodiment) of the second body 320 so as to surround the outer circumferential surface of the second longitudinal side of the second body 320, also rises together with the second body 320. Thus, the bypass-side on/off valve 500 is spaced apart from the protrusion 140 and the bypass passage 120 is opened.

When the internal passage of the returning pipe 200 is sealed and the bypass passage 120 is opened, the entire transmission oil introduced into the body 100 is introduced into the bypass passage 120, flows through the second heat exchanger 50, and returns to the transmission 20, as shown in FIG. 9.

Meanwhile, if the first body 310 inclines to a side while rising, the first body 310 may not be accurately seated on a lower end of the internal passage of the returning pipe 200. Thus, the internal passage of the returning pipe 200 may not be completely sealed. Accordingly, at least three guide protrusions 210 may be provided in the internal passage of the returning pipe 200 at a side directed toward the returning-side on/off valve 400 such that the guide protrusions 210 extend to come into contact with an outer end of the returning-side on/off valve 400. As described above, when the guide protrusions 210 guiding the outer end of the returning-side on/off valve 400 are provided, the first body 310 may normally rise without inclining to a side. Thus, the internal passage of the returning pipe 200 may be completely sealed.

That is, a flow direction of the transmission oil introduced into the first heat exchanger may be automatically changed depending on a temperature of the transmission oil by using the assembly 1 according to the present invention. Thus, it is advantageous in that a temperature of the transmission oil may be maintained within a predetermined range without a separate thermostat for measuring a temperature of the transmission oil, or without a separate control device.

Although the assembly according to the present invention is installed inside the first heat exchanger for heating or cooling the transmission oil so that a temperature of the transmission oil may be maintained within the predetermined range, the assembly may also be installed inside a heat exchanger for heating or cooling engine oil so that a temperature of the engine oil may be maintained within a predetermined range.

Although the preferred embodiments of the present invention have been disclosed in detail for illustrative purposes, the scope and spirit of the invention are not limited thereto, and those skilled in the art will appreciate that various modifications, additions and substitutions are possible, without departing from the scope and spirit of the invention as disclosed in the accompanying claims.

The invention claimed is:

1. A transmission oil bypass assembly, the assembly comprising:
    a body formed in a pipe shape such that a first longitudinal side of the body is inserted into a first heat exchanger by crossing transmission oil passages formed in the first heat exchanger for heat exchange between coolant having passed through a coolant heater and transmission oil drawn from a transmission, with a bypass passage provided at a second longitudinal side of the body by protruding outside the first heat exchanger, and openings formed on a side wall of the body to allow the transmission oil to be introduced therethrough;
    a returning pipe coupled to the first heat exchanger so as to communicate with the first longitudinal side of the body, and configured to return the transmission oil introduced through the body to the transmission;
    a thermal expansion unit configured to increase or decrease a length thereof depending on a temperature of the transmission oil flowing in the first heat exchanger, the thermal expansion unit being inserted into the body;
    a returning-side on/off valve coupled to a first longitudinal side of the thermal expansion unit, and configured to close an internal passage of the returning pipe when the length of the thermal expansion unit is increased; and
    a bypass-side on/off valve coupled to a second longitudinal side of the thermal expansion unit, and configured to close the bypass passage when the length of the thermal expansion unit is decreased.

2. The assembly of claim 1, wherein the thermal expansion unit includes:
    a first body formed in a cylindrical shape, and filled with wax expanded by external heat;
    a ductile cap configured to seal an inlet of the first body, and deformed by the expansion of the wax;
    a second body formed in a pipe shape, and coupled to the inlet of the first body and filled with flowable silicone in part of interior space thereof, the part facing the ductile cap; and
    a piston of which a first longitudinal side is inserted into the second body and a second longitudinal side is fixed to an interior of the body.

3. The assembly of claim 2, wherein the returning-side on/off valve is coupled to a first longitudinal side of the first body so as to surround an outer circumferential surface of the first longitudinal side of the first body, and the bypass-side on/off valve is coupled to a second longitudinal side of the second body so as to surround an outer circumferential surface of the second longitudinal side of the second body.

4. The assembly of claim 3, wherein a seat block having a seat groove formed therein is provided at a position inside the body, at which the bypass passage is formed, and
    the second longitudinal side of the piston is inserted into the seat groove.

5. The assembly of claim 1, further comprising:
    a spring inserted into the body so as to surround the thermal expansion unit such that a first longitudinal side of the spring is directed toward the returning pipe, and a second longitudinal side of the spring is seated on the bypass-side on/off valve; and
    a stopper placed to cover an inner circumferential surface of the first longitudinal side of the body such that the first longitudinal side of the spring is seated on the stopper.

6. The assembly of claim 5, further comprising:
    a stop ring coupled to the inner circumferential surface of the body so as to support a first side of the stopper, the first side of the stopper being opposite to a second side of the stopper on which the spring is seated.

7. The assembly of claim 1, wherein at least three guide protrusions are provided in the internal passage of the returning pipe at a side directed toward the returning-side on/off valve such that the guide protrusions extend to come into contact with an outer end of the returning-side on/off valve.

8. The assembly of claim 1, wherein a protrusion is formed on an inner circumferential surface of an inlet of the bypass passage, and the bypass-side on/off valve is seated on the protrusion of the bypass passage, thereby sealing the bypass passage.

9. The assembly of claim 1, wherein the bypass passage is configured such that the transmission oil is supplied through the bypass passage to a second heat exchanger for heat exchange between the coolant cooled by a radiator and the transmission oil.

* * * * *